(12) United States Patent
Jiang et al.

(10) Patent No.: US 6,501,194 B1
(45) Date of Patent: Dec. 31, 2002

(54) ENERGY RECOVERY SNUBBER CIRCUIT FOR BIDIRECTIONAL POWER CONVERTER AND METHOD OF OPERATION THEREOF

(75) Inventors: Yimin Jiang, Plano, TX (US); Hengchun Mao, Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 281 days.

(21) Appl. No.: 09/652,887

(22) Filed: Aug. 31, 2000

Related U.S. Application Data

(63) Continuation-in-part of application No. 09/479,514, filed on Jan. 7, 2000.

(51) Int. Cl.$^7$ ............................................... H02J 7/00
(52) U.S. Cl. ..................... 307/66; 307/80; 307/104; 307/151; 363/15; 363/17
(58) Field of Search ................................ 307/66, 80, 104, 307/151; 363/17

(56) References Cited

U.S. PATENT DOCUMENTS

| | | | | | |
|---|---|---|---|---|---|
| 6,115,271 A | * | 9/2000 | Mo | .............................. | 363/56 |
| 6,304,461 B1 | * | 10/2001 | Walker | ....................... | 363/17 |
| 6,362,979 B1 | * | 3/2002 | Gucyski | ..................... | 363/17 |

* cited by examiner

*Primary Examiner*—Stephen W. Jackson
*Assistant Examiner*—Robert L. Deberadinis
(74) *Attorney, Agent, or Firm*—Hitt, Gaines & Boisbrun PC

(57) ABSTRACT

An energy recovery snubber circuit for a bidirectional power converter, a method of operation thereof and a power plant employing the bidirectional power converter. The bidirectional power converter has first and second inputs, an inductor coupled to the first input and a power switch coupled between the inductor and the second input. In one embodiment, the energy recovery snubber circuit includes: (1) a clamping capacitor coupled to the second input; (2) a clamping diode coupled between the clamping capacitor and the first input; and (3) a snubber inductor coupled to a node between the clamping capacitor and the clamping diode.

20 Claims, 3 Drawing Sheets

ENERGY RECOVERY SNUBBER CIRCUIT FOR BIDIRECTIONAL POWER CONVERTER AND METHOD OF OPERATION THEREOF

CROSS-REFERENCE TO RELATED APPLICATIONS

This application is a continuation in part of U.S. patent application Ser. No. 09/479,514, entitled "POWER SUPPLY PROVIDING BACKUP AC VOLTAGE AND METHOD OF OPERATION THEREOF," filed on Jan. 7, 2000, commonly assigned with the present application and incorporated herein by reference.

This application is related to U.S. patent application Ser. No. 09/198,918, entitled "SYSTEM AND METHOD FOR PROVIDING BATTERY BACKUP POWER," filed on Nov. 24, 1998, commonly assigned with the present application and incorporated herein by reference.

TECHNICAL FIELD OF THE INVENTION

The present invention is directed, in general, to power conversion and, more specifically, to a snubber circuit for a bidirectional power converter.

BACKGROUND OF THE INVENTION

A power converter is a power processing circuit that converts an input voltage or current waveform into a specified output voltage or current waveform. A switched-mode power converter is a frequently employed power converter that converts an input voltage into a specified output voltage. A buck power converter is a step-down converter that receives an input voltage and produces an output voltage that, on average, is lower than the input voltage. A boost power converter is a step-up converter that converts the input voltage to an output voltage that is greater than the input voltage. Buck and boost power converters are frequently employed in telecommunications applications as part of a power plant.

While power converters are generally employed to receive power at an input thereof and to transmit the power to a load at an output of the power converter, there are some applications that may require bidirectional power transmission. In battery back-up applications, for example, a battery is frequently used to provide back-up power in the case of a power outage. A power converter may, in a normal mode of operation, be required to provide power of a specific voltage to charge the battery. Then, during a power outage, the power converter may be required to convert power from the battery to power of another voltage as may be required for powering the load equipment.

A non-isolated bidirectional power converter that may be employed in such applications generally includes an energy storage device (e.g., an inductor) and a first power switch series-coupled across a battery. A second power switch may then be coupled to a node between the energy storage device and the first power switch. Depending on the mode of operation, the bidirectional power converter may be employed as a buck power converter or as a boost converter. When operating as a buck power converter, the second power switch is employed to regulate the voltage provided to the battery while the first power switch is employed as a rectifying switch. Alternatively, when operating as a boost power converter, the first power switch is employed to charge the boost inductor, while the second power switch is employed as a rectifying switch.

Analogous to all types of power converters, the bidirectional power converter is subject to inefficiencies that impair its overall performance. The first and second power switches [e.g., metal-oxide semiconductor field-effect transistors (MOSFETs)] are subject to losses when substantial voltage and current are simultaneously imposed thereon during the transition periods thereof. The losses associated with the first and second power switches increase linearly as the switching frequency of the bidirectional power converter increases. Therefore, efforts to minimize the losses associated with the first and second power switches will improve the overall efficiency of the bidirectional power converter.

Accordingly, what is needed in the art is snubber circuit that improves the operation of the bidirectional power converter.

SUMMARY OF THE INVENTION

To address the above-discussed deficiencies of the prior art, the present invention provides an energy recovery snubber circuit for a bidirectional power converter, a method of operation thereof and a power plant employing the bidirectional power converter. The bidirectional power converter has first and second inputs, an inductor coupled to the first input and a power switch coupled between the inductor and the second input. In one embodiment, the energy recovery snubber circuit includes: (1) a clamping capacitor coupled to the second input; (2) a clamping diode coupled between the clamping capacitor and the first input; and (3) a snubber inductor coupled to a node between the clamping capacitor and the clamping diode.

The present invention introduces, in one aspect, a snubber circuit for a bidirectional power converter. The bidirectional power converter has first and second inputs and an inductor coupled to the first input. The second input is coupled to a voltage source having a leakage inductance associated therewith. The snubber circuit is configured to provide a path for current in the leakage inductance to flow from the second input to the first input.

In another aspect of the present invention, the bidirectional power converter is couplable to an AC bus via a transformer winding and subject to losses resulting from a parasitic inductance of the transformer winding. The snubber circuit is configured to provide a path for current in the parasitic inductance to flow between the transformer winding and the first input. The path may be formed, for example, by a series-coupled clamping capacitor and clamping diode coupled between the transformer winding and the first input. The snubber circuit is further configured to maintain a charge balance of the clamping capacitor by employing a snubber inductor coupled to a node between the clamping capacitor and the clamping diode.

In one embodiment of the present invention, the snubber circuit further includes a second diode series coupled to the snubber inductor. The second diode defines a path for current to flow from the clamping capacitor to the clamping diode.

In one embodiment of the present invention, the bidirectional power converter forms a portion of a power plant having a primary power stage coupled to an AC bus. In this embodiment, the bidirectional power converter is coupled to the primary power stage via the AC bus. The AC bus may further provide inter-connectivity to other parts of the power plant, such as an output stage.

In a related embodiment, the primary power stage includes a startup circuit. The startup circuit may include, for example, a startup inductor coupled across an input of the primary power stage. The startup circuit may further include a startup diode series coupled to the startup inductor.

Alternatively, the startup circuit may include a startup transformer having first and second startup windings. The first startup winding may be coupled across an inductor of the bidirectional power converter, while the second startup winding may be coupled across the input of the primary power stage. The startup circuit may further include a startup diode series coupled to the second startup winding.

In another related embodiment, the primary power stage includes an input capacitor. The startup circuit may be configured to charge the input capacitor when the primary power stage is not converting primary power. The startup circuit may thus enable the primary power stage to develop a voltage across a primary winding thereof, which forms a portion of the AC bus, thereby allowing the bidirectional power converter to provide power to the AC bus.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
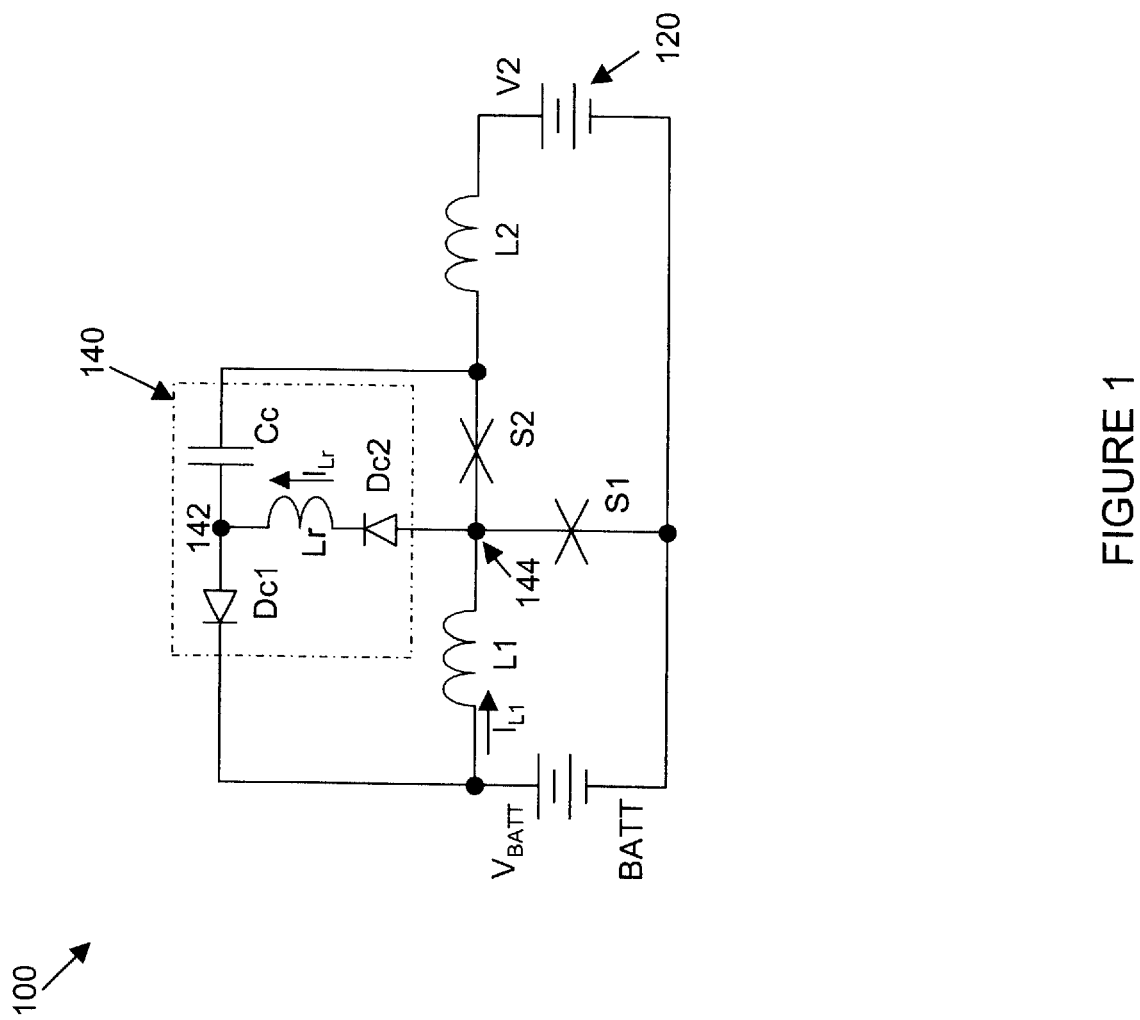
FIG. 1 illustrates a schematic diagram of an embodiment of a bidirectional power converter constructed according to the principles of the present invention.

Referring initially to FIG. 1, illustrated is a schematic diagram of an embodiment of a bidirectional power converter 100 constructed according to the principles of the present invention. The bidirectional power converter 100 has a first input couplable to a battery BATT and a second input couplable to a voltage source 120. The bidirectional power converter 100 includes a first inductor L1 coupled to the first input. The bidirectional power converter 100 further includes first and second power switches S1, S2 coupled to the first inductor L1. The second power switch S2 is coupled to the second input.

The bidirectional power converter 100 is subject to energy loss resulting from leakage inductances associated with the voltage source 120. In the illustrated embodiment, the leakage inductance is represented by a second inductor L2 coupled to the voltage source 120. The present invention, therefore, introduces an energy recovery snubber circuit 140 that recovers a substantial portion of the leakage inductance energy. In the illustrated embodiment, the snubber circuit 140 is a passive circuit and includes a clamping capacitor Cc coupled to the second input. The snubber circuit 140 further includes a first clamping diode Dc1 coupled between the clamping capacitor Cc and the first input. The snubber circuit 140 further includes a snubber inductor Lr coupled to a first node 142 (between the clamping capacitor Cc and the first clamping diode Dc1). The snubber circuit 140 still further includes a second diode Dc2 coupled between the snubber inductor Lr and a second node 144 (between the first inductor L1 and the first and second power switches S1, S2).

The bidirectional power converter 100 is operable as both a boost converter and a buck converter. In a boost converter mode, the bidirectional power converter 100 converts power from the battery BATT to provide power to the voltage source 120. The first power switch S1 is ON for a first interval to allow the battery BATT to charge the first inductor L1, which is functioning as a boost inductor. The second power switch S2 is OFF during this interval, isolating the second output.

Then, for a second interval, the first power switch S1 is OFF while the second power switch S2 is ON. The second output now receives energy from the first inductor L1 as well as from the battery BATT. When the first power switch S1 is turned OFF, a first inductor current $I_{L1}$ that was flowing through the first inductor L1 would ideally be pushed through the second power switch S2 to the voltage source 120. The leakage inductance of the voltage source 120 (represented by the second inductor L2), however, resist the current flow, causing a voltage spike to develop across the leakage inductance and the first power switch S1.

The snubber circuit 140, therefore, advantageously provides a path for the first inductor current $I_{L1}$ to flow through the second power switch S2, the clamping capacitor Cc and the first clamping diode Dc1, thereby charging the clamping capacitor Cc. A voltage across the clamping capacitor Cc, in conjunction with a voltage of the battery BATT, charges the leakage inductance, gradually diverting the first inductor current $I_{L1}$ to the voltage source 120. A voltage across the clamping capacitor Cc causes a snubber inductor current $I_{Lr}$ to flow from the clamping capacitor Cc through the second diode Dc2, when the second power switch S2 is ON, to maintain a charge balance of the clamping capacitor Cc. The snubber circuit 140 thus provides a venue for energy from the leakage inductance of the voltage source 120 to be recovered to the battery BATT by the switching action of the first and second power switches S1, S2.

In a buck converter mode, the bidirectional power converter 100 converts power from the voltage source 120 to provide power to the battery BATT. The second power switch S2 regulates a voltage supplied to the battery BATT, while the first power switch S1 operates essentially as a freewheeling diode.

For a first interval, the second power switch S2 is ON to transfer energy from the voltage source 120 to the battery BATT as well as to the first inductor L1. The first power switch S1 is OFF during the first interval. Then, for a second interval, the second power switch S2 is OFF. The first power switch S1 now conducts to allow current in the first inductor L1 to circulate through the first power switch S1, the first inductor L1 and the battery BATT.

When the second power switch S2 is turned OFF to start a second interval, the current that was flowing through the second power switch S2 and the first inductor L1 now circulates through the first power switch S1 and the first inductor L1. A leakage current through the leakage inductance of the voltage source 120 now flows through the clamping capacitor Cc and the first clamping diode Dc1, thereby charging the clamping capacitor Cc. The switching action of the first and second power switches S1, S2, in conjunction with the inductor Lr, provides a mechanism for maintaining a charge balance of the clamping capacitor Cc.

To maintain a charge balance of the clamping capacitor Cc, during the first interval (when the second power switch S2 is ON), a voltage across the clamping capacitor Cc causes a snubber inductor current $I_{L_r}$ to flow from the clamping capacitor Cc, through the second diode Dc2 to the snubber inductor Lr.

Figure 2:
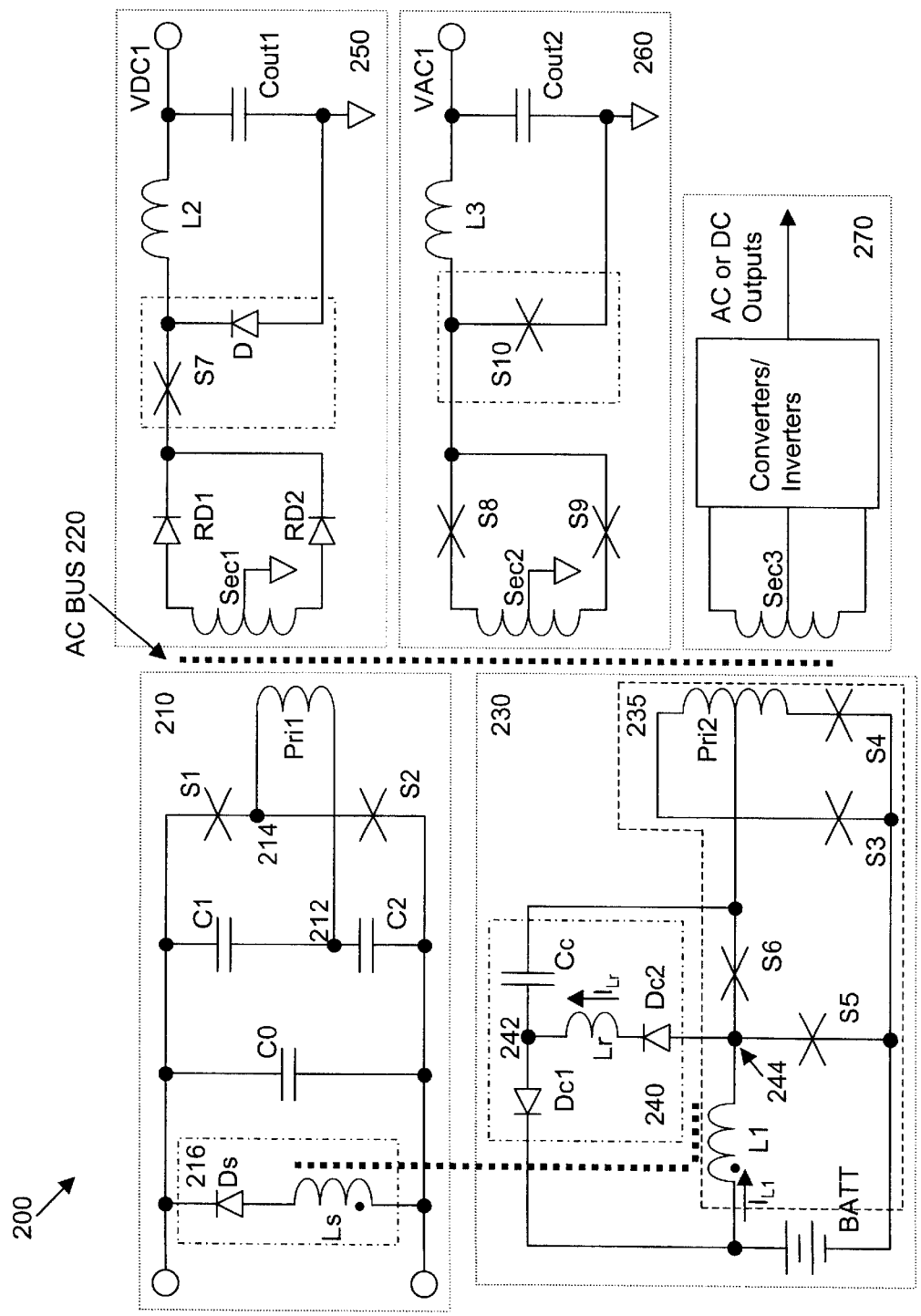
FIG. 2 illustrates a schematic diagram of an embodiment of a power plant constructed according to the principles of the present invention.

Turning now to FIG. 2, illustrated is a schematic diagram of an embodiment of a power plant 200 constructed according to the principles of the present invention. The power plant 200 includes a primary power stage 210 that provides primary power to an AC bus 220. The power plant 200 further includes a backup power stage 230 that provides backup power to the AC bus 220, which is represented as a magnetic flux in a core of a transformer.

The power plant 200 further includes a first output power stage 250, coupled to the AC bus 220, that converts the AC power on the AC bus 220 to provide DC power having a DC voltage VDC1. The power plant 200 further includes a second output power stage 260, coupled to the AC bus 220, that converts the AC power on the AC bus 220 to provide AC power having an AC voltage VAC1. While the illustrated power plant 200 employs both a DC output power stage is (first output power stage 250) and an AC output power stage (second output power stage 260), those skilled in the pertinent art realize that the present invention does not require the use of any one or both of the first and second output power stages 250, 260. Depending on the particular application, the power plant 200 may have any number of DC or AC output power stages.

The power plant 200 still further includes a number of optional converters or inverters (generally designated 270) coupled to the AC bus 220. The converters/inverters 270 may employ any conventional topology to provide AC or DC output voltages as may be required in a particular application. Of course, the converters/inverters 270 are not required by the present invention.

The primary power stage 210 includes an input capacitor C0 coupled across an input of the primary power stage 210. The primary power stage 210 further includes first and second capacitors C1, C2 and first and second power switches S1, S2 arranged in a half-bridge topology. A primary power winding Pri1, which forms a portion of the AC bus 220, is coupled between a first node 212 (between the first and second capacitors C1, C2) and a second node 214 (between the first and second power switches S1, S2). Those skilled in the pertinent art are familiar with the conventional half-bridge topology and its operation.

The primary power stage 210 may further include a startup circuit 216. In the illustrated embodiment, the startup circuit 216 includes a startup inductor Ls (a transformer winding) coupled across an input of the primary power stage 210. The startup circuit 216 further includes a startup diode Ds series coupled to the startup inductor Ls. The startup inductor Ls advantageously provides one option for the backup power stage 230 to provide power to charge the input capacitor C0 when the primary power stage 210 is not converting primary power (e.g., during a backup mode of operation).

In the illustrated embodiment, the backup power stage 230 includes a bidirectional power converter 235. The bidirectional power converter 235 includes third and fourth power switches S3, S4 coupled to a backup power winding Pri2, which forms a portion of the AC bus 220. The bidirectional power converter 235 further includes a first inductor L1 couplable to a battery BATT. The first inductor L1 is magnetically coupled to the startup inductor Ls of the startup circuit 216. The bidirectional power converter 235 further includes fifth and sixth power switches S5, S6 coupled to the first inductor L1.

The bidirectional power converter 235 is subject to energy loss resulting from leakage inductances in the backup power winding Pri2. The present invention, therefore, introduces an energy recovery snubber circuit 240 that recovers substantially all of the transformer leakage inductance energy. In the illustrated embodiment, the snubber circuit 240 is a passive circuit and includes a clamping capacitor Cc coupled to the backup power winding Pri2. The snubber circuit 240 further includes a first clamping diode Dc1 coupled between the clamping capacitor Cc and the first inductor L1. The snubber circuit 240 further includes a snubber inductor Lr coupled to a third node 242 (between the clamping capacitor Cc and the first clamping diode Dc1). The snubber circuit 240 still further includes a second diode Dc2 coupled between the snubber inductor Lr and a fourth node 244 (between the first inductor L1 and the sixth power switch S6).

The first output power stage 250 includes first and second rectifying diodes RD1, RD2 coupled to a first secondary winding Sec1. The first output power stage 250 further includes an optional seventh power switch S7 and freewheeling diode D coupled the first and second rectifying diodes RD1, RD2. The first output power stage 250 still further includes an output filter formed by a second inductor L2 and a first output capacitor Cout1. The first output power stage 250 is configured to receive the AC power from the AC bus and develop therefrom regulated DC power having a DC voltage VDC1.

The second output power stage 260 includes eighth and ninth power switches S8, S9 coupled to a second secondary winding Sec2. The second output power stage 260 further includes an optional tenth switch S10 coupled to a node between the eight and ninth power switches S8, S9. While the eighth, ninth and tenth switches S8, S9, S10 are illustrated as generic switches, those skilled in the pertinent art realize that the eighth, ninth and tenth switches S8, S9, S10 may be bidirectional switches, as may be required in a particular application. The second output power stage 260 still further includes an output filter formed by a third inductor L3 and a second output capacitor Cout2. The second output power stage 260 is configured to receive the AC power from the AC bus and develop therefrom regulated AC power having an AC voltage VAC1.

The power plant 200 operates as follows. In a normal mode of operation, the primary power stage 200 supplies power to the AC bus 220. The bidirectional power converter 235 receives power from the AC bus 220 and charges the battery BATT. The power plant 200 is further operable in a backup mode of operation in which the bidirectional power converter 235 transfers power from the battery BATT to the AC bus 220. In either case, the optional first and second output power stages 250, 260 and the optional converters/inverters 270 receive power from the AC bus 220 and provide AC or DC power as may be required in a particular application.

In the normal mode of operation, the bidirectional power converter 235 is configured to operate as a buck power converter to convert AC power from the AC bus 220 into DC power suitable for charging the battery BATT. The third and fourth power switches S3, S4 alternately conduct to rectify the AC power from the AC bus 220. The sixth power switch S6 regulates a voltage supplied to the battery BATT while the fifth power switch S5 operates essentially as a freewheeling diode. To promote zero current switching (ZCS), the third and fourth power switches S3, S4 are preferably switched ON or OFF a short time before the sixth power switch S6 is turned ON. With the sixth power switch S6 OFF and the fifth power switch S5 ON, current in the first inductor L1 flows through the fifth power switch S5. The third and fourth power switches S3, S4 may thus be switched with little or no current therethrough.

For a first interval, the sixth power switch S6 is ON to transfer energy from the AC bus 220 to the battery BATT as well as to the first inductor L1. The fifth power switch S5 is OFF during the first interval. Then, for a second interval, the sixth power switch S6 is OFF. The fifth power switch S5 now conducts to allow current in the first inductor L1 to circulate through the fifth power switch S5, the first inductor L1 and the battery BATT.

When the sixth power switch S6 is turned OFF to start a second interval, the current that was flowing through the sixth power switch S6 and the first inductor L1 now circulates through the fifth power switch S5 and the first inductor L1. A leakage current through the leakage inductances of the backup primary winding Pri2 now flows through the clamping capacitor Cc and the first clamping diode Dc1, thereby charging the clamping capacitor Cc. Since a voltage of the battery BATT, in conjunction with a voltage across the clamping capacitor Cc, is now greater than a voltage across the backup primary winding Pri2, the leakage current can be discharged.

To maintain a charge balance of the clamping capacitor Cc, during the first interval (when the sixth power switch S6 is ON), a voltage across the clamping capacitor Cc causes a snubber inductor current $I_{Lr}$ to flow from the clamping capacitor Cc, through the second diode Dc2 to the snubber inductor Lr. Then, when the fifth power switch S5 is ON (during the second interval), remaining energy from the snubber inductor Lr may be delivered to the battery BATT.

In the backup mode of operation, the bidirectional power converter 235 is further configured to operate as a boost power converter to convert DC power from the battery BATT to provide it backup power to the AC bus 220. In the backup mode, the fifth power switch S5 is ON for a first interval to allow the battery BATT to charge the first inductor L1, which is functioning as a boost inductor. During the first interval, the sixth power switch S6 is OFF, isolating the output stage. The third and fourth power switches S3, S4 may thus be turned ON or OFF with substantially zero current therethrough during (or a short time before the end of) the first interval.

Then, for a second interval, the fifth power switch S5 is OFF. The output stage now receives energy from the first inductor L1 as well as from the battery BATT. The third and fourth power switches S3, S4 alternately conduct to supply power to the AC bus 220. When the fifth power switch S5 is turned OFF, a first inductor current $I_{L1}$ that was flowing through the first inductor L1 would ideally be pushed through the sixth switch S6 to the backup primary winding Pri2. The leakage inductances in the backup primary winding Pri2, however, resist the current flow, causing a voltage spike to develop across the backup primary winding Pri2 and the fifth power switch S5.

The snubber circuit 240, therefore, advantageously provides a path for the first inductor current $I_{L1}$ to flow through the sixth switch S6, the clamping capacitor Cc and the first clamping diode Dc1, thereby charging the clamping capacitor Cc. A voltage across the clamping capacitor Cc, in conjunction with a voltage of the battery BATT, charges the leakage inductances, gradually diverting the first inductor current $I_{L1}$ to the backup primary winding Pri2. At the same time, a voltage across the clamping capacitor Cc causes a snubber inductor current $I_{Lr}$ to flow from the clamping capacitor Cc through the second diode Dc2 to maintain a charge balance of the clamping capacitor Cc. The snubber circuit 240 thus provides a venue for energy from the leakage inductances of the backup power winding Pri2 to be recovered to the battery BATT by the switching action of the fifth and sixth power switches S5, S6.

The power plant 200 typically enters the backup mode of operation once main power is no longer available. During a startup of the backup mode of operation, a voltage across the backup primary winding Pri2 is about zero since the main power is not available to maintain a charge across the input capacitor C0. The startup circuit 216, therefore, provides an optional way for the input capacitor C0 to be charged by a voltage across the first inductor L1. During the first interval, the fifth power switch S5 is ON to allow the battery BATT to charge the first inductor L1. Since the first inductor L1 is magnetically coupled to the startup inductor Ls, energy from the battery BATT may also be employed to charge the input capacitor C0. Once a voltage across the input capacitor C0 has increased beyond a threshold voltage Vth of the lit power switches, the first power switch S1 (of the primary power stage 210) and the fourth power switch S4 (of the bidirectional power converter 230) may be turned on to allow the first inductor L1 to discharge through the backup primary winding Pri2 of the AC bus 220.

Figure 3:
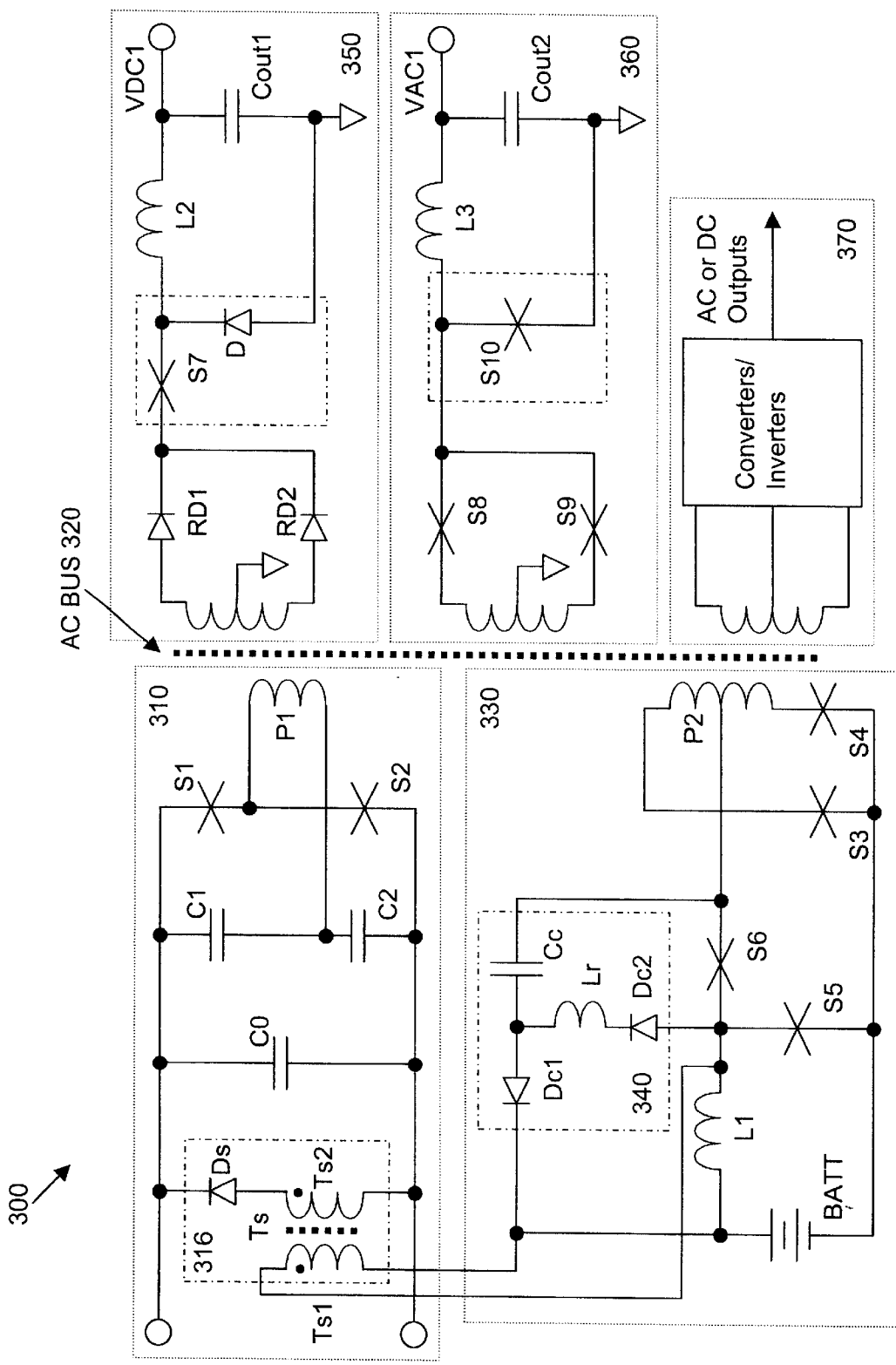
FIG. 3 illustrates a schematic diagram of another embodiment of a power plant constructed according to the principles of the present invention.

Turning now to FIG. 3, illustrated is a schematic diagram of another embodiment of a power plant 300 constructed according to the principles of the present invention. The power plant 300 includes a primary power stage 310 that provides primary power to an AC bus 320. The power plant 300 further includes a backup power stage 330 that provides backup power to the AC bus 320.

The power plant 300 further includes a first output power stage 350, coupled to the AC bus 320, that converts the AC power on the AC bus 320 to provide regulated DC power having a DC voltage VDC1. The power plant 300 further includes a second output power stage 360, coupled to the AC bus 320, that converts the AC power on the AC bus 320 to provide regulated AC power having an AC voltage VAC1.

The power plant 300 still further includes a number of optional converters or inverters (generally designated 370) coupled to the AC bus 320. The converters/inverters 370 may employ any conventional topology to provide AC or DC output voltages as may be required in a particular application. Of course, the converters/inverters 370 are not required by the present invention.

The primary power stage 310 is substantially similar to the primary power stage 210 illustrated and described with respect to FIG. 2, but employs a different startup circuit 316. In the illustrated embodiment, the startup circuit 316 includes a startup transformer Ts having a first startup winding Ts1 and a second startup winding Ts2. The second startup winding Ts2 is coupled across an input of the primary power stage 310. The startup circuit 316 further includes a startup diode D2 series coupled to the second startup winding Ts2. The first startup winding Ts1 is coupled across an inductor L1 of the backup power stage 330.

By coupling the first startup winding Ts1 across the inductor L1, energy from the inductor L1 may be transferred to the second startup winding Ts2 and onto an input capacitor C0 of the primary power stage 310. Of course, other components or circuits may be employed to transfer energy from the inductor L1 of the bidirectional power converter 330 to the primary power stage 310.

Those skilled in the art should understand that the previously described embodiments of the power plant and related method are submitted for illustrative purposes only and other embodiments are well within the broad scope of the present invention. Additionally, exemplary embodiments of the present invention have been illustrated with reference to specific electronic components. adz Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies.

For a better understanding of power electronics including power supplies and conversion technologies, see "Principles of Power Electronics," by J. G. Kassakian, M. F. Schlecht and G. C. Verghese, Addison-Wesley (1991). For a better understanding of power supply architectures, see "Powering Architectures for New Needs in Telecommunications," by D. Jugan, J. P. Leblanc and D. Marquet, Intelec '95 (1995) and "New Power Supply Structure for Telecom Equipments Toward a Unique Level of Conversion," by Didier Marquet and Jacques Girard, Intelec '91 (1991). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. For use with a bidirectional power converter having first and second inputs, an inductor coupled to said first input and a power switch coupled between said inductor and said second input, an energy recovery snubber circuit, comprising:
   a clamping capacitor coupled to said second input;
   a clamping diode coupled between said clamping capacitor and said first input; and
   a snubber inductor coupled to a node between said clamping capacitor and said clamping diode.

2. The snubber circuit as recited in claim 1, further comprising a second diode series coupled to said snubber inductor.

3. The snubber circuit as recited in claim 1, wherein said bidirectional power converter forms a portion of a power plant having a primary power stage coupled to an AC bus, said bidirectional power converter coupled to said primary power stage via said AC bus.

4. The snubber circuit as recited in claim 3, wherein said primary power stage comprises a startup circuit.

5. The snubber circuit as recited in claim 4, wherein said startup circuit comprises an element selected from the group consisting of:
   a startup inductor, and
   a startup transformer.

6. The snubber circuit as recited in claim 4, wherein said startup circuit comprises a startup diode.

7. The snubber circuit as recited in claim 4, wherein said primary power stage comprises an input capacitor, said startup circuit configured to charge said input capacitor when said primary power stage is not converting primary power.

8. For use with a bidirectional power converter having first and second inputs, an inductor coupled to said first input and a power switch coupled between said inductor and said second input, said second input couplable to an AC bus via a transformer winding and subject to losses resulting from a parasitic inductance of said transformer winding, a method of reducing said losses, comprising:
   providing a path for current in said parasitic inductance to flow between said transformer winding and said first input, said path formed by a series-coupled clamping capacitor and clamping diode coupled between said transformer winding and said first input; and
   maintaining a charge balance of said clamping capacitor with a snubber inductor coupled to a node between said clamping capacitor and said clamping diode.

9. The method as recited in claim 8, wherein said maintaining said charge balance comprises employing a second diode series coupled to said snubber inductor.

10. The method as recited in claim 8, wherein said bidirectional power converter forms a portion of a power plant having a primary power stage coupled to said AC bus, said bidirectional power converter coupled to said primary power stage via said AC bus.

11. The method as recited in claim 10, wherein said primary power stage comprises a startup circuit.

12. The method as recited in claim 11, wherein said startup circuit comprises an element selected from the group consisting of:
   a startup inductor, and
   a startup transformer.

13. The method as recited in claim 11, wherein said startup circuit comprises a startup diode.

14. The method as recited in claim 11, wherein said primary power stage comprises an input capacitor, said startup circuit charging said input capacitor when said primary power stage is not converting primary power.

15. A power plant, comprising:
   a transformer having primary and backup power windings and a secondary winding;
   a primary power stage coupled to said primary power winding;
   a bidirectional power converter having:
      a first input couplable to a battery,
      a second input coupled to said backup power winding,
      an inductor coupled to said first input,
      a power switch coupled between said inductor and said second input, and
      an energy recovery snubber circuit, including:
         a clamping capacitor coupled to said second input,
         a clamping diode coupled between said clamping capacitor and said first input, and
         a snubber inductor coupled to a node between said clamping capacitor and said clamping diode; and
   an output stage coupled to said secondary winding.

16. The power plant as recited in claim 15, wherein said snubber circuit comprises a second diode series coupled to said snubber inductor.

17. The power plant as recited in claim 15, wherein said primary power stage comprises a startup circuit.

18. The power plant as recited in claim 17, wherein said startup circuit comprises an element selected from the group consisting of:
   a startup inductor, and
   a startup transformer.

19. The power plant as recited in claim 17, wherein said startup circuit comprises a startup diode.

20. The power plant as recited in claim 17, wherein said primary power stage comprises an input capacitor, said startup circuit configured to charge said input capacitor when said primary power stage is not converting primary power.

* * * * *